United States Patent
Zhou et al.

(10) Patent No.: US 11,240,164 B2
(45) Date of Patent: Feb. 1, 2022

(54) METHOD FOR OBTAINING PATH INFORMATION OF DATA PACKET AND DEVICE

(71) Applicant: HUAWEI TECHNOLOGIES CO., LTD., Guangdong (CN)

(72) Inventors: Xingwang Zhou, Nanjing (CN); Feng Li, Nanjing (CN); Jin Li, Nanjing (CN); Xia Zhu, Nanjing (CN); Congjuan Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/241,006

(22) Filed: Jan. 7, 2019

(65) Prior Publication Data
US 2019/0140965 A1    May 9, 2019

Related U.S. Application Data

(63) Continuation of application No. PCT/CN2017/092387, filed on Jul. 10, 2017.

(30) Foreign Application Priority Data

Jul. 12, 2016    (CN) .......................... 201610547906.4

(51) Int. Cl.
*G06F 15/16*    (2006.01)
*H04L 12/823*    (2013.01)
(Continued)

(52) U.S. Cl.
CPC ............ *H04L 47/32* (2013.01); *H04L 45/122* (2013.01); *H04L 45/20* (2013.01); *H04L 45/74* (2013.01); *H04L 47/11* (2013.01); *H04L 45/121* (2013.01)

(58) Field of Classification Search
CPC ....... H04L 47/32; H04L 45/122; H04L 45/20; H04L 45/74; H04L 47/11; H04L 45/121
(Continued)

(56) References Cited

U.S. PATENT DOCUMENTS 8,155,126 B1    4/2012   Mao et al.
9,007,956 B2 *  4/2015   Kompella ............... H04L 45/02
                                                           370/254

(Continued)

FOREIGN PATENT DOCUMENTS

CN      101479998 A     7/2009
CN      101505279 A     8/2009
(Continued)

OTHER PUBLICATIONS

Office Action issued in Chinese Application No. 201610547906.4 dated Jan. 16, 2020, 16 pages (with English translation).
(Continued)

*Primary Examiner* — Alan S Chou
(74) *Attorney, Agent, or Firm* — Fish & Richardson P.C.

(57) ABSTRACT

The present disclosure relates to methods and devices for obtaining path information of a data packet. One example method includes receiving, by a network device, a data packet transmitted in a network, and obtaining, by the network device, path information of the data packet from a source end to a destination end, where the path information is a total hop count of routers passed through by the data packet from the source end to the destination end or a latency of the data packet from the source end to the destination end.

14 Claims, 3 Drawing Sheets

(51) Int. Cl.
*H04L 12/801* (2013.01)
*H04L 12/733* (2013.01)
*H04L 12/741* (2013.01)
*H04L 12/727* (2013.01)

(58) Field of Classification Search
USPC .......................................................... 709/232
See application file for complete search history.

(56) References Cited

U.S. PATENT DOCUMENTS

| | | | |
|---|---|---|---|
| 2006/0182034 A1* | 8/2006 | Klinker | H04L 45/3065 370/238 |
| 2007/0297401 A1 | 12/2007 | Bosch et al. | |
| 2008/0205292 A1 | 8/2008 | Denby et al. | |
| 2013/0121192 A1* | 5/2013 | Titus | H04L 43/0829 370/252 |
| 2014/0161015 A1 | 6/2014 | Brown, III et al. | |
| 2016/0127219 A1* | 5/2016 | Akhavain Mohammadi | H04L 41/22 709/224 |
| 2016/0269266 A1* | 9/2016 | Hooda | H04L 43/16 |

FOREIGN PATENT DOCUMENTS

| | | |
|---|---|---|
| CN | 101572649 A | 11/2009 |
| CN | 101594264 A | 12/2009 |
| CN | 103428032 A | 12/2013 |
| JP | 2005150791 A | 6/2005 |
| JP | 2009010689 A | 1/2009 |
| JP | 2009111440 A | 5/2009 |
| JP | 2009260911 A | 11/2009 |
| JP | 2009542047 A | 11/2009 |
| WO | 2014103014 A1 | 7/2014 |

OTHER PUBLICATIONS

Extended European Search Report issued in European Application No. 17826954.4 dated Apr. 25, 2019, 9 pages.
Office Action issued in Japanese Application No. 2019/501729 dated Feb. 18, 2020, 11 pages (With English Translation).
International Search Report and Written Opinion issued in International Application No. PCT/CN2017/092387 dated Sep. 5, 2017, 16 pages.
Bao-Li et al., "Self-adaptive Routing with Multiple Areas and Layers for Lifetime Optimization in Wireless Sensor Networks," Journal of Chinese Computer Systems, vol. 33, No. 12, Dec. 2012, 5 pages (with English abstract).
Liang et al., "Optimizing Route-Cache Lifetime in Ad Hoc Networks," IEEE Infocom 2003. Twenty-second Annual Joint Conference of the IEEE Computer and Communications Societies, vol. 1, Mar. 2003, 11 pages.
Office Action issued in Chinese Application No. 201610547906.4 dated Sep. 8, 2021, 6 pages (with English translation).

* cited by examiner

METHOD FOR OBTAINING PATH INFORMATION OF DATA PACKET AND DEVICE

CROSS-REFERENCE TO RELATED APPLICATIONS

This application is a continuation of International Application No. PCT/CN2017/092387, filed on Jul. 10, 2017, which claims priority to Chinese Patent Application No. 201610547906.4, filed on Jul. 12, 2016. The disclosures of the aforementioned applications are hereby incorporated by reference in their entireties.

TECHNICAL FIELD

This application relates to the communications field, and in particular, to a method for obtaining path information of a data packet and a device.

BACKGROUND

A data packet is a data unit exchanged and transmitted in a network, namely a data block to be sent by a station at a time. The data packet includes complete data information to be sent. Data packets vary greatly in length, and a length of a data packet is not limited and variable. The data packet is a unit of network transmission. In a transmission process, a data packet is encapsulated into a segment, a packet, or a frame for transmission. Encapsulation is performed in a manner of adding some information segments, which are data organized in a specific format in a packet header. For example, the information segments include information such as a packet type, a packet version, a packet length, and a packet entity.

During implementation of a prior-art solution, the following technical problems are found in the prior art:

An Active Queue Management (AQM) mechanism of a network device, such as a router, is used to perform packet dropping when network congestion occurs, to alleviate the congestion. In the current AQM mechanism, a random dropping manner is mainly used, and a TCP congestion control algorithm is mainly used to adjust a congestion window of a TCP flow, so that a TCP sending rate best matches a physical bandwidth and a congestion status of a network. The current TCP congestion control algorithm adjusts the congestion window mainly based on the current sending rate of the TCP flow and a packet loss state, but for the network congestion, path information (for example, a hop count of routers or an Round-Trip Time (RTT) value) of a data packet is also a very important reference parameter. However, the path information of the data packet cannot be obtained in the prior art.

SUMMARY

This application provides a method for obtaining path information of a data packet and a device, to improve resource utilization of a network.

According to a first aspect, a method for obtaining path information of a data packet is provided, where the method includes the following steps: receiving, by a network device, a data packet transmitted in a network; and obtaining, by the network device, path information of the data packet from a source end to a destination end based on a source address and a destination address of the data packet, where the path information is a total hop count of routers passed through by the data packet from the source end to the destination end or a latency of the data packet from the source end to the destination end.

According to the technical solution provided in the first aspect of this application, after the data packet is received, the source address and the destination address of the data packet are obtained, and the path information from the source end to the destination end is obtained based on the source address and the destination address, so that the network device can obtain the path information of the data packet. Therefore, the technical solution has an advantage of obtaining path information of a data packet.

In a possible design, when the path information includes the total hop count of routers, the obtaining, by the network device, path information of the data packet from a source end to a destination end based on a source address and a destination address of the data packet specifically includes: calculating a first hop count of routers of the data packet from the source end to the network device based on a time to live value of the data packet, and finding a second hop count of routers from the network device to the destination address based on the destination address of the data packet and from a mapping relationship between an address and a hop count of routers, where a sum of the first hop count and the second hop count is the total hop count of routers passed through from the source end to the destination end.

The possible design provides a specific manner of obtaining the total hop count of routers, supporting the network device in obtaining the path information from the source end to the destination end.

In another possible design, when the path information includes the total hop count of routers, the obtaining, by the network device, path information of the data packet from a source end to a destination end based on a source address and a destination address of the data packet specifically includes: finding a third hop count of routers from the source end to the network device based on the source address of the data packet and from a mapping relationship between an address and a hop count of routers, and finding a fourth hop count of routers from the network device to the destination address based on the destination address of the data packet and from the mapping relationship between an address and a hop count of routers, where a sum of the third hop count and the fourth hop count is the total hop count of routers passed through from the source end to the destination end.

The another possible design provides another specific manner of obtaining the total hop count of routers, supporting the network device in obtaining the path information from the source end to the destination end.

In still another possible design, when the path information includes the total hop count of routers, the obtaining, by the network device, path information of the data packet from a source end to a destination end based on a source address and a destination address of the data packet specifically includes: when the data packet does not include the total hop count of routers, sending, by the network device, a query packet to find a fifth hop count from the network device to the destination end, where a sum of the fifth hop count and a sixth hop count from the source end to the network device is the total hop count of routers, and filling the total hop count of routers into an extension field of the data packet, where a destination address of the query packet and the destination address of the data packet are the same.

The still another possible design provides still another specific manner of obtaining the total hop count of routers, supporting the network device in obtaining the path information from the source end to the destination end.

In yet another possible design, the total hop count of routers in the foregoing possible designs may be loaded to an extension field of a service packet corresponding to the data packet In still yet another possible design, the mapping relationship between an address and a hop count of routers specifically includes: receiving, by the network device, a routing packet diffused in the network, where the routing packet includes an address and a hop count of network segment routers in each network segment passed through during diffusion from the address to the network device; obtaining, by the network device, a seventh hop count from the network device to an edge device based on a network topology of a network segment in which the network device is located, where a sum of the hop count of network segment routers in each network segment and the seventh hop count plus 1 gives a total hop count of routers from the network device to the address; and storing a mapping relationship between the address and the total hop count of routers of the address, where the edge device is the last device, in the network segment in which the network device is located, passed through when the data packet is sent from the network segment in which the network device is located to the address.

The still yet another possible design provides a specific implementation of obtaining the mapping relationship between an address and a hop count of routers, supporting implementation of the possible design, the another possible design, and the still another possible design.

In a further possible design, when network congestion occurs, the network device determines a packet dropping policy of the data packet based on the path information, or the network device determines a transmission rate of the data packet based on the path information.

In the further possible design, the network device adjusts the packet dropping policy of the data packet or the transmission rate of the data packet based on the path information, optimizing the packet dropping policy and improving the transmission rate.

According to a second aspect, a network device is provided, where the network device includes:

a transceiver unit, configured to receive a data packet transmitted in a network; and a processing unit, configured to obtain path information of the data packet from a source end to a destination end based on a source address and a destination address of the data packet, where the path information is a total hop count of routers passed through by the data packet from the source end to the destination end or a latency of the data packet from the source end to the destination end.

After receiving the data packet, the network device provided in the second aspect of this application obtains the source address and the destination address of the data packet, obtains the path information from the source end to the destination end based on the source address and the destination address, and can further obtain the path information of the data packet. Therefore, the network device has an advantage of obtaining path information of a data packet.

In subsequent possible designs, the processing unit may be configured to implement the possible design, the another possible design, the still another possible design, the yet another possible design, the still yet another possible design, and the further possible design in the first aspect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

DESCRIPTION OF EMBODIMENTS

Figure 1:
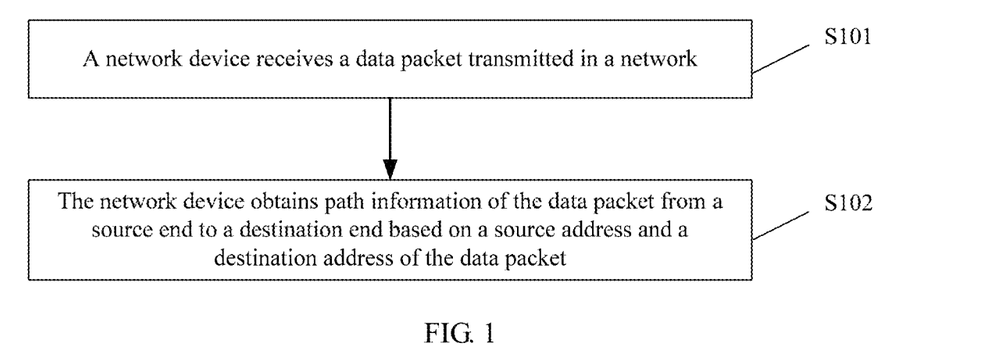
FIG. 1 is a schematic flowchart of a method for obtaining path information of a data packet according to this application.

Referring to FIG. 1, FIG. 1 shows a method for obtaining path information of a data packet according to an embodiment of this application. The method is applied to a network device, and the network device includes but is not limited to a device such as a router, a node, or a server. As shown in FIG. 1, the method includes the following steps.

Step 101. The network device receives a data packet transmitted in a network.

The receiving in step 101 may be performed in a wired manner, or may certainly be performed in a wireless manner. This embodiment is not limited to the foregoing receiving manners.

Step 102. The network device obtains path information of the data packet from a source end to a destination end based on a source address and a destination address of the data packet, where the path information may be a total hop count of routers passed through by the data packet from the source end to the destination end or a latency of the data packet from the source end to the destination end.

When the path information may be the total hop count of routers, that the network device may obtain path information of the data packet from a source end to a destination end based on a source address and a destination address may specifically include:

the network device obtains a Time To Live (TTL) value in the data packet, calculates a first hop count of routers of the data packet from the source end to the network device based on the TTL value, and finds a second hop count of routers from the network device to the destination address based on the destination address of the data packet and from a mapping relationship between an address and a hop count of routers, where a sum of the first hop count and the second hop count is the total hop count of routers passed through from the source end to the destination end.

An implementation of calculating the first hop count of routers of the data packet from the source end to the network device based on the TTL value may be: According to the TCP protocol, an initial value of TTL is 64. The value decreases by 1 each time when a router is passed through. Therefore, the first hop count of routers passed through can be obtained by directly subtracting the TTL value of the data packet from 64.

A manner of obtaining the mapping relationship between an address and a hop count of routers may specifically include:

the network device receives a routing packet diffused in the network, where the routing packet includes an address (usually is an IP address of a source end device that diffuses the routing packet) and a hop count of network segment routers in each network segment passed through during diffusion from the address to the network device; the network device obtains a seventh hop count from the network device to an edge device based on a network topology of a network segment in which the network device is located, where a sum of the hop count of network segment routers in each network segment and the seventh hop count plus 1 gives a total hop count of routers from the network device to the address; and the network device stores a mapping relationship between the address and the total hop count of routers of the address, where the edge device is the last device, in the network segment in which the network device is located, passed through when the data packet is sent from the network segment in which the network device is located to the address.

The foregoing routing packet may be specifically implemented by extending an IGP (English full name: Interior Gateway Protocol) routing packet. Table 1 shows a format of an extended routing packet:

TABLE 1

| LS age | | Options | Type: 3/4/5 |
|---|---|---|---|
| Link state ID | | | |
| Advertising Router | | | |
| LS sequence number | | | |
| LS checksum | | Length | |
| Network mask | | | |
| 0 | metric | | |
| TOS | TOS metric | | |
| Distance | | | |
| ... | | | |

For a definition of another field in Table 1, refer to a definition in the IGP routing protocol. Details are not provided herein. In this application, the hop count of network segment routers in each network segment is carried in a Distance field in Table 1.

The hop count of network segment routers in each network segment may be obtained in the following manner: According to the IGP protocol, a router in a local network area (commonly referred to as a network segment) may sense a network topology of the local network area, and may obtain, based on the network topology and the destination address of the data packet, a hop count of routers in a network area passed through by the data packet. A specific implementation may be as follows: According to the IGP protocol, each router may learn of a network topology structure of an area in which the router is located, and may obtain a hop count of network segment routers from the router to the network segment based on the network topology structure. In this application, one Distance field is added to the routing packet, and the hop count of network segment routers in each network segment is added to the Distance field. The following uses a practical example to describe how to obtain the hop count of routers.

Figure 3:
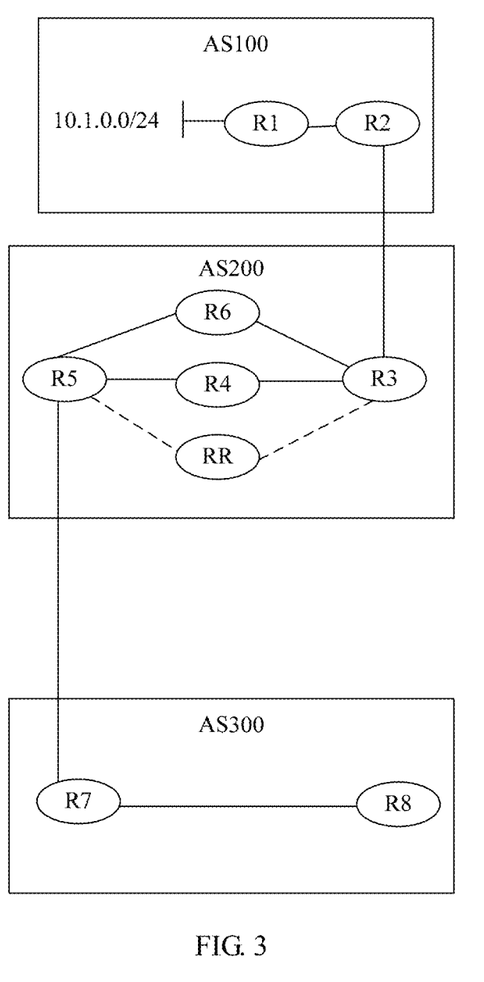
FIG. 3 is a schematic diagram of another implementation scenario of a plurality of networks according to an embodiment of this application.

Using a network shown in FIG. 3 as an example, for ease of description, the network device herein is represented by "R", and a digit behind R indicates a number of the network device. For example, "R2" indicates a second network device in the network. A specific implementation method is as follows.

When R2 diffuses information about a 10.0.1.0/24 network segment to an AS200, a hop count of routers from R2 to the 10.0.1.0/24 network segment is added to original information of an AS_PATH property of the routing packet (as shown in the last line of the following code):

AS path segment: 100
path segment type: AS_SEQUENCE (2)
path segment length: 1 AS
path segment value: 100, 2

In "path segment value: 100, 2", "100" indicates an identifier of a network area passed through, and "2" indicates a hop count of routers passed through by the data packet in the network area indicated by 100.

Similarly, after R3 diffuses the information to R5, R5 calculates a hop count of routers from R5 to R3 by using the IGP of the AS200, adds the hop count to an Update packet, and diffuses the Update packet to an AS300.

AS path segment: 100 200
path segment type: AS_SEQUENCE (2)
path segment length: 2 AS
path segment value: 100, 2, 200, 3

In "path segment value: 100, 2, 200, 3", "200" indicates an identifier of a network area in which R3 is located, and "200, 3" indicates that three routers are passed through in the network area indicated by 200. Herein, it is assumed that a network device that establishes the mapping relationship between an address and a total hop count of routers is R8, and the address carried in the routing packet is 10.0.1.0/24. For R8, a value of Distance is 2+3=5. For the AS300, the last device passed through when the data packet is sent from the AS300 to 10.0.1.0/24 is R7, so R7 is the edge device. It can be learned from a network topology that a hop count of routers from R8 to R7 is 1, and therefore a total hop count of routers passed through from R8 to 10.0.1.0/24 is 2+3+1+1=7. Then, R8 stores the mapping relationship between the total hop count of routers, which is 7, and the address 10.0.1.0/24.

To better describe establishment of the mapping relationship, herein, R5 in the AS200 is used as an example to describe how R5 establishes a mapping relationship between 10.0.1.0/24 and a total hop count of routers. For R5, a value of Distance is 2 (indicates only a hop count of routers in an AS100), the network segment in which R5 is located is the AS200, and the last device passed through when the data packet is sent from the AS200 to 10.0.1.0/24 is R3. Based on a topology structure of the AS200, a hop count of routers passed through from R5 to R3 is 2, and therefore a total hop count of routers from R5 to 10.0.1.0/24 is 2+2+1=5. R5 stores the mapping relationship between the total hop count of routers, which is 5, and the address 10.0.1.0/24.

If the routing information includes the total hop count of routers, the implementation method of step 102 may alternatively be specifically:

a third hop count of routers from the source end to the network device is found based on the source address of the data packet and from a mapping relationship between an address and a hop count of routers, and a fourth hop count of routers from the network device to the destination address is found based on the destination address of the data packet and from the mapping relationship between an address and a hop count of routers, where a sum of the third hop count and the fourth hop count is the total hop count of routers passed through from the source end to the destination end.

For the manner of obtaining the mapping relationship between an address and a hop count of routers, refer to the foregoing description. Details are not repeated herein.

The latency from the source end to the destination end may be obtained by sending a probe packet by a source end network device or a destination end network device. For a specific manner of sending the probe packet and a specific manner of obtaining the latency, refer to definitions in the TCP protocol. Details are not provided herein. After obtaining the latency, the source end network device adds the latency to the data packet.

Step 103 (not shown in the figure). When network congestion occurs, the network device determines a packet dropping policy of the data packet or a transmission rate of the data packet based on the path information of the data packet.

If the path information includes the latency of the data packet from the source end to the destination end, the packet dropping policy in step 103 may specifically include the following policy:

the network device defines that a dropping probability of a data packet with a large latency from the source end to the destination end is less than a dropping probability of a data packet with a small latency from the source end to the destination end.

The packet dropping policy in step 103 may specifically include the following policy:

the network device defines that a dropping probability of a data packet with a large total hop count of routers is less than a dropping probability of a data packet with a small hop count of routers.

Certainly, the packet dropping policy in step 103 may further specifically include the following policy:

a plurality of intervals are obtained through division based on a total hop count of routers, and a different queue length, queue threshold, and packet dropping probability are defined for each interval, where a queue length of an interval in which a total hop count of routers is large is greater than a queue length of an interval in which a total hop count of routers is small; a queue threshold of an interval in which a total hop count of routers is large is greater than a queue threshold of an interval in which a total hop count of routers is small; and a packet dropping probability of an interval in which a total hop count of routers is large is greater than a packet dropping probability of an interval in which a total hop count of routers is small.

Certainly, step 103 may alternatively be replaced by the following solution: The network device determines the transmission rate of the data packet based on the path information of the data packet; or the network device defines that a transmission rate of a data packet with a large latency from the source end to the destination end is greater than a dropping probability of a data packet with a small latency from the source end to the destination end; or the network device defines that a transmission rate of a data packet with a large total hop count of routers is greater than a transmission rate of a data packet with a small total hop count of routers.

In the technical solution provided in this application, after the data packet is received, the path information of the data packet is obtained. Therefore, the technical solution has an advantage of obtaining path information of a data packet. Then, the path information is used to determine the packet dropping policy or the transmission rate of the data packet, and therefore targeted dropping is performed on the to-be-sent data packet, and resource utilization of the network is improved as much as possible.

Figure 2:
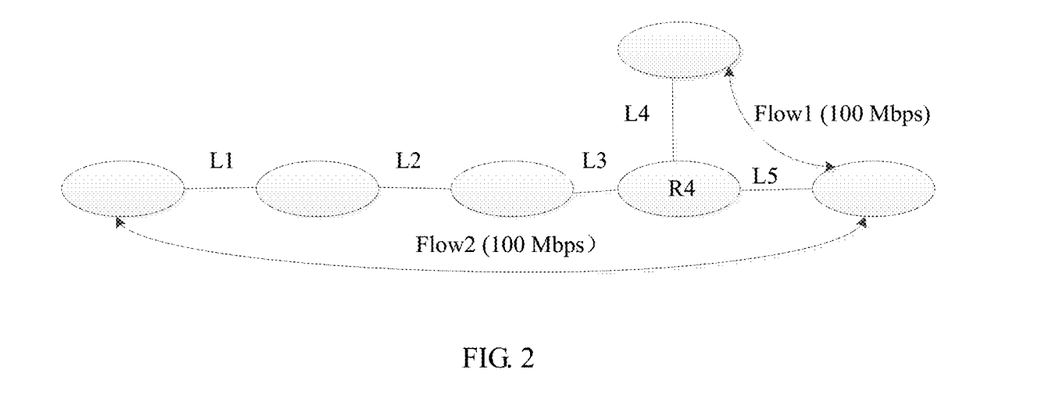
FIG. 2 is a schematic diagram of an implementation scenario of a plurality of networks according to an embodiment of this application.

The following uses FIG. 2 to describe technical effects of the technical solution provided in this embodiment of this application. FIG. 2 shows a technical solution of using path information to prevent network congestion. As shown in FIG. 2, a system shown in FIG. 2 includes six network devices. For ease of distinguishing between the six network devices, the six network devices are named R1, R2, R3, R4, R5, and R6, and their connection manners are shown by solid lines in FIG. 2. For ease of distinguishing, links between the six network devices are named L1, L2, L3, L4, and L5. Herein, it is assumed that there are only two flows among the network devices shown in FIG. 2. For ease of distinguishing, the two flows are named Flow1 and Flow2. Flow1 may be sent by R5 to R6 via R4, and links that Flow1 passes through may be L4 and L5. Flow1 may be sent by R1 to R6 via R1, R2, R3, and R4, and links that Flow1 passes through may be L1, L2, L3, and L5. Herein, it is assumed that a maximum network speed of L5 is 100 Mbps, and maximum network speeds of L1, L2, L3, and L4 are all 60 Mbps.

Herein, it is assumed that all the links shown in FIG. 2 are at the maximum network speeds. The maximum network speed of L5 is 100 Mbps, the maximum network speeds of L3 and L4 are both 60 Mbps, and a sum of the network speeds of L3 and L4 is 120 Mbps. Consequently, if all the links are at the maximum network speeds, congestion occurs on R4. In this case, to ease the congestion, a packet needs to be dropped. There are only two flows Flow1 and Flow2, and R4 may choose to drop a data packet of Flow1 or drop a data packet of Flow2. The following analyzes the resource utilization of the network when a data packet of Flow1 or of Flow2 is dropped.

If a packet of Flow1 is dropped (a hop count of routers passed through is 1):

the links L1, L2, and L3 are not affected. According to a definition in the TCP protocol, when a packet is dropped, a network speed of a link corresponding to the dropped packet decreases by half. Therefore, the network speed of L4 decreases to 30 Mbps, and the network speed of L5 decreases to 90 Mbps. The network speed of L5 is less than the maximum network speed 100 Mbps, and congestion does not occur. In this case, in terms of the resource utilization of the network, only resource utilization of L4 is 50%, and resource utilizations of L1, L2, and L3 are all 100%.

If a packet of Flow2 is dropped (a hop count of routers passed through is 3):

the L4 link is not affected, the network speeds of L1, L2, and L3 all decrease to 30 Mbps, and the network speed of L5 decreases to 90 Mbps. The network speed of L5 is less than the maximum network speed 100 Mbps, and congestion does not occur. In this case, in terms of the resource utilization of the network, the resource utilizations of L1, L2, and L3 are all 50%, and the resource utilization of L4 is 100%.

It can be learned that the resource utilization when a packet of Flow2 is dropped is less than the resource utilization when a packet of Flow1 is dropped. That is, if a data packet on a flow that passes through a larger hop count of routers is dropped, more links that are farther away from a congestion point are affected, reducing the overall resource utilization of the network. Conversely, if a data packet on a flow that passes through a smaller hop count of routers is dropped, the overall resource utilization of the network is improved.

Figure 4:
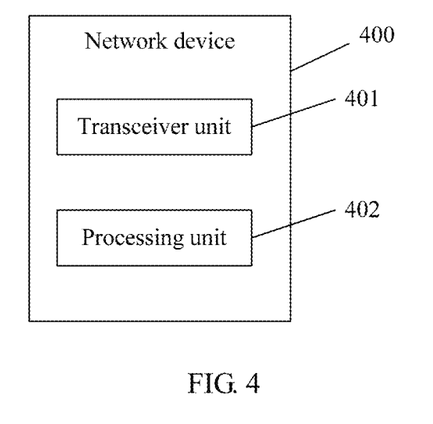
FIG. 4 is a schematic structural diagram of a network device according to this application.

Referring to FIG. 4, FIG. 4 shows a network device 400 provided in this application. The network device includes but is not limited to a device that can send or forward a data packet, such as an intelligent terminal, a computer, a server, a switch, or a router. For definitions and examples of terms in this embodiment, refer to the embodiment corresponding to FIG. 1. Details are not repeated herein. The network device 400 includes:

a transceiver unit 401, configured to receive a data packet transmitted in a network; and a processing unit 402, configured to obtain path information of the data packet from a source end to a destination end based on a source address and a destination address of the data packet, where the path information is a total hop count of routers passed through by the data packet from the source end to the destination end or a latency of the data packet from the source end to the destination end.

After receiving the data packet, the network device provided in this application obtains the source address and the destination address of the data packet, obtains the path information from the source end to the destination end based on the source address and the destination address, and can further obtain the path information of the data packet. Therefore, the network device has an advantage of obtaining path information of a data packet.

Optionally, the processing unit 402 may be further configured to perform step 102 and step 103 and implement the detailed solutions of step 102 and step 103 in the foregoing embodiment shown in FIG. 1.

Figure 5:
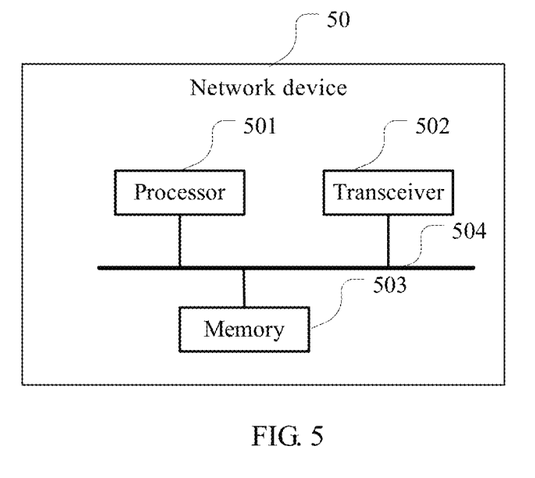
FIG. 5 is a schematic structural diagram of hardware of a network device according to this application.

Referring to FIG. 5, FIG. 5 is a simplified schematic diagram of a network device 50 provided in an embodiment of this application. The network device 50 includes but is not limited to a device such as a mobile phone, a tablet computer, a server, a base station, or a mobile switching center. As shown in FIG. 5, the network device 50 includes a processor 501, a memory 503, a transceiver 502, and a bus 504. The transceiver 502 is configured to receive data from and send data to an external device. The network device 50 may have one or more processors 501. In some embodiments of this application, the processor 501, the memory 503, and the transceiver 502 may be connected by using a bus system or in another manner. The network device 50 may be configured to execute the method shown in FIG. 1. For definitions and examples of terms in this embodiment, refer to the embodiment corresponding to FIG. 1. Details are not repeated herein.

The transceiver 502 is configured to receive a data packet transmitted in a network or a routing packet diffused in the network.

The memory 503 stores program code. The processor 501 is configured to invoke the program code stored in the memory 503 to perform the following operations:

the processing unit 501 is configured to obtain path information of the data packet from a source end to a destination end based on a source address and a destination address of the data packet, where the path information is a total hop count of routers passed through by the data packet from the source end to the destination end or a latency of the data packet from the source end to the destination end.

Optionally, the processor 501 may be further specifically configured to perform step 102 and step 103 and implement the detailed solutions of step 102 and step 103 in the foregoing embodiment shown in FIG. 1. For a specific description of the foregoing steps, refer to the description in the embodiment shown in FIG. 1. Details are not repeated herein.

It should be noted that the processor 501 herein may be a processing element, or may be a collective term of a plurality of processing elements. For example, the processing element may be a central processing unit (Central Processing Unit, CPU), may be an application-specific integrated circuit (Application-Specific Integrated Circuit, ASIC), or may be configured as one or more integrated circuits for implementing this embodiment of this application, for example, one or more microprocessors (digital signal processor, DSP), or one or more field programmable gate arrays (Field Programmable Gate Array, FPGA).

The memory 503 may be a storage apparatus, or may be a collective term of a plurality of storage elements, and is configured to store executable program code, or a parameter, data, and the like that are required for running of an application program running apparatus. Moreover, the memory 503 may include a random access memory (RAM), or may include a non-volatile memory (non-volatile memory), for example, a disk memory or a flash memory (Flash).

The bus 504 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 5, but this does not mean that there is only one bus or only one type of bus.

The network device may further include an input/output apparatus that is connected to the bus 504, so as to connect to another part such as the processor 501 by using the bus. The input/output apparatus may provide an input interface for an operator, so that the operator can select a control item on the input interface, or may be another interface. The input/output apparatus may connect to another device by using the interface.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that the embodiments described in this specification all belong to embodiments, and the involved actions and modules are not necessarily required by this application.

In the foregoing embodiments, the description of each embodiment has respective focuses. For a part that is not described in detail in an embodiment, refer to related descriptions in other embodiments.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (English: Read-Only Memory, ROM for short), a random access memory (English: Random Access Memory, RAM for short), a magnetic disk, an optical disc, or the like.

The content downloading method, the related device, and the system provided in the embodiments of this application are described in detail above. The principle and implementation of this application are described herein through specific examples. The description about the embodiments of this application is merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A method for determining a packet dropping policy of a data packet, comprising:
   receiving, by a network device, the data packet transmitted in a network;
   obtaining, by the network device, path information of the data packet from a source end to a destination end based on a source address of the source end and a destination address of the destination end of the data packet, wherein the path information comprises a total hop count of routers passed through by the data packet from the source end to the destination end; and
   determining, by the network device, the packet dropping policy of the data packet based on the path information when network congestion occurs, wherein
      the packet dropping policy comprises that a dropping probability of a data packet with a relatively large total hop count of routers is less than a dropping probability of a data packet with a relatively small total hop count of routers.

2. The method according to claim 1, wherein the method further comprises:
   loading the total hop count of routers to an extension field of a service packet corresponding to the data packet.

3. The method according to claim 1, wherein the method further comprises:
   receiving, by the network device, a routing packet diffused in the network, wherein the routing packet comprises the destination address and a third hop count of network segment routers in each network segment passed through during diffusion from the destination end to the network device;
   obtaining, by the network device, a fourth hop count from the network device to an edge device based on a network topology of a network segment in which the network device is located, wherein a sum of the third hop count of network segment routers in each network segment and the fourth hop count plus 1 gives a second hop count of routers from the network device to the destination end; and
   storing a mapping relationship between the destination end and the second hop count of routers, wherein the edge device is the last device, in the network segment in which the network device is located, passed through when the data packet is sent from the network segment in which the network device is located to the destination end.

4. The method according to claim 1, wherein the method further comprises:
   determining, by the network device and based on a transmission rate determination policy, a transmission rate of the data packet based on the path information, wherein the transmission rate determination policy comprises, in response to the path information comprising the total hop count of routers passed through by the data packet from the source end to the destination end, defining, by the network device, that the transmission rate of the data packet becomes higher when the total hop count of routers passed through by the data packet becomes larger.

5. The method according to claim 1, wherein when the path information comprises the total hop count of routers, the obtaining, by the network device, the path information of the data packet from the source end to the destination end based on the source address and the destination address of the data packet comprises:
   calculating a first hop count of routers passed through by the data packet from the source end to the network device based on a time to live value of the data packet;
   finding a second hop count of routers from the network device to the destination end based on the destination address of the data packet and from a mapping relationship between the destination address and the second hop count of routers; and
   summing the first hop count and the second hop count, thereby arriving at the total hop count of routers passed through from the source end to the destination end.

6. The method according to claim 1, wherein when the path information comprises the total hop count of routers, the obtaining, by the network device, the path information of the data packet from the source end to the destination end based on the source address and the destination address of the data packet comprises:
   finding a third hop count of routers from the source end to the network device based on the source address of the data packet and from a mapping relationship between an address and a hop count of routers; and
   finding a fourth hop count of routers from the network device to the destination address based on the destination address of the data packet and from the mapping relationship between an address and a hop count of routers, wherein a sum of the third hop count and the fourth hop count is the total hop count of routers passed through from the source end to the destination end.

7. The method according to claim 1, wherein when the path information comprises the total hop count of routers, the obtaining, by the network device, the path information of the data packet from the source end to the destination end based on the source address and the destination address of the data packet comprises:
   when the data packet does not comprise the total hop count of routers, sending, by the network device, a query packet to find a fifth hop count from the network device to the destination end, wherein a sum of the fifth hop count and a sixth hop count from the source end to the network device is the total hop count of routers; and
   filling the total hop count of routers into an extension field of the data packet, wherein a destination address of the query packet and the destination address of the data packet are the same.

8. A network device for determining a packet dropping policy of a data packet, wherein the network device comprises:
   a transceiver, the transceiver configured to receive the data packet transmitted in a network; and
   at least one processor, the at least one processor configured to obtain path information of the data packet from a source end to a destination end based on a source address of the source end and a destination address of the destination end of the data packet, wherein the path information comprises a total hop count of routers passed through by the data packet from the source end to the destination end; and to determine the packet dropping policy of the data packet based on the path information when network congestion occurs, wherein the packet dropping policy comprises that a dropping probability of a data packet with a relatively large total hop count of routers is less than a dropping probability of a data packet with a relatively small total hop count of routers.

9. The network device according to claim 8, wherein the at least one processor is further configured to load the total hop count of routers to an extension field of a service packet corresponding to the data packet.

10. The network device according to claim 8, wherein:

the transceiver is further configured to receive a routing packet diffused in the network, wherein the routing packet comprises the destination address and a third hop count of network segment routers in each network segment passed through during diffusion from the destination end to the network device; and the at least one processor is configured to:

obtain a fourth hop count from the network device to an edge device based on a network topology of a network segment in which the network device is located, wherein a sum of the third hop count of network segment routers in each network segment and the fourth hop count plus 1 gives a second hop count of routers from the network device to the destination end; and store a mapping relationship between the destination end and the second hop count of routers, wherein the edge device is the last device, in the network segment in which the network device is located, passed through when the data packet is sent from the network segment in which the network device is located to the destination end.

11. The network device according to claim 8, wherein:

the at least one processor is further configured to determine, based on a transmission rate determination policy, a transmission rate of the data packet based on the path information, wherein the transmission rate determination policy comprises, in response to the path information comprising the total hop count of routers passed through by the data packet from the source end to the destination end, defining, by the network device, that the transmission rate of the data packet becomes higher when the total hop count of routers passed through by the data packet becomes larger.

12. The network device according to claim 8, wherein when the path information comprises the total hop count of routers, the at least one processor is configured to:

calculate a first hop count of routers passed through by the data packet from the source end to the network device based on a time to live value of the data packet;

find a second hop count of routers from the network device to the destination end based on the destination address of the data packet and from a mapping relationship between the destination address and the second hop count of routers; and sum the first hop count and the second hop count, thereby arriving at the total hop count of routers passed through from the source end to the destination end.

13. The network device according to claim 8, wherein when the path information comprises the total hop count of routers, the at least one processor is configured to:

find a third hop count of routers from the source end to the network device based on the source address of the data packet and from a mapping relationship between an address and a hop count of routers; and find a fourth hop count of routers from the network device to the destination address based on the destination address of the data packet and from the mapping relationship between an address and a hop count of routers, wherein a sum of the third hop count and the fourth hop count is the total hop count of routers passed through from the source end to the destination end.

14. The network device according to claim 8, wherein when the path information comprises the total hop count of routers, the at least one processor is configured to:

when the data packet does not comprise the total hop count of routers, send, for the network device, a query packet to find a fifth hop count from the network device to the destination end, wherein a sum of the fifth hop count and a sixth hop count from the source end to the network device is the total hop count of routers; and fill the total hop count of routers into an extension field of the data packet, wherein a destination address of the query packet and the destination address of the data packet are the same.

* * * * *